United States Patent [19]

Joekel et al.

[11] 4,107,832

[45] Aug. 22, 1978

[54] METHOD FOR WINDING SPIRAL FINS ONTO OVAL TUBING

[75] Inventors: Alfred Joekel, Essen-Werden; Hans Langen; Peter Denner, both of Ratingen, all of Fed. Rep. of Germany

[73] Assignee: Balke-Durr Aktiengesellschaft, Ratingen, Fed. Rep. of Germany

[21] Appl. No.: 569,887

[22] Filed: Apr. 21, 1975

Related U.S. Application Data

[63] Continuation-in-part of Ser. No. 451,589, Mar. 15, 1974, abandoned.

[30] Foreign Application Priority Data

Jul. 31, 1974 [DE] Fed. Rep. of Germany ....... 2436768

[51] Int. Cl.[2] .............................................. B23P 15/26

[52] U.S. Cl. .......................... 29/157.3 AH; 29/240.5; 29/727; 165/184

[58] Field of Search ................................ 29/157.3 AH

[56] References Cited

U.S. PATENT DOCUMENTS

| | | | |
|---|---|---|---|
| 1,720,508 | 7/1929 | Bundy | 29/157.3 AH |
| 1,896,350 | 2/1933 | Bundy | 29/157.3 AH |
| 2,956,335 | 10/1960 | Matheny et al. | 29/157.3 AH |
| 2,965,744 | 12/1960 | Büsse | 29/157.3 AH |
| 3,000,084 | 9/1961 | Garland | 29/157.3 AH |
| 3,112,558 | 12/1963 | Nihlen et al. | 29/157.3 AH |
| 3,134,166 | 5/1964 | Venables | 29/157.3 AH |
| 3,288,209 | 11/1966 | Wall et al. | 29/157.3 AH |
| 3,427,427 | 2/1969 | Rudd | 29/157.3 AH |
| 3,456,319 | 7/1969 | Gier, Jr. | 29/157.3 AH |
| 3,688,375 | 9/1972 | Venables | 29/157.3 AH |
| 3,773,241 | 11/1973 | Norris | 29/157.3 AH |

FOREIGN PATENT DOCUMENTS

| | | | |
|---|---|---|---|
| 1,402,779 | 1/1969 | Fed. Rep. of Germany | 29/157.3 AH |
| 1,402,779 | 3/1971 | Fed. Rep. of Germany | 29/157.3 AH |
| 947,544 | 1/1964 | United Kingdom | 29/157.3 AH |

*Primary Examiner*—C.W. Lanham
*Assistant Examiner*—V. K. Rising
*Attorney, Agent, or Firm*—Joseph A. Geiger

[57] ABSTRACT

A method and device for producing finned heat transfer tubing of oval cross section by winding one or more continuous metal strips around the tubing in the form of spiral fins, the contact edge of the metal strip being shaped prior to winding to present a hook-shaped ledge with an acute enclosed angle, and the neutral axis for on-edge bending being shifted to the vicinity of the contact edge by applying to the strip a tensile stress and to its upper half additional transverse compression stress, using a stretch roller and a cooperating winding guide. A lathe-like machine semi-automatically winds two metal strips onto successive lengths of oval tubing, using a carriage with two pivotable winding arms and two strip reels.

6 Claims, 13 Drawing Figures

METHOD FOR WINDING SPIRAL FINS ONTO OVAL TUBING

RELATED APPLICATIONS

This application is a continuation-in-part of our co-pending application Ser. No. 451,589, filed Mar. 15, 1974 now abandoned.

BACKGROUND OF THE INVENTION

1. Field of the Invention

The present invention relates to methods and devices for the manufacture of finned heat transfer tubing, and more particularly to a method and device for winding spiral fins onto oval tubing from one or several continuous lengths of metal strip.

2. Description of the Prior Art

Finned tubing is used primarily in heat exchangers where a first carrier medium, normally a liquid, passes through the inside of the tubing, while a second carrier medium, normally air or a gas, flows transversely to the tubing, in contact with its fins, so that heat is transferred from one carrier medium to the other. It is known to manufacture such heat transfer tubing by winding onto a length of smooth tubing a continuous metal strip, whereby the metal strip is bent edgewise to form a helical fin around the tubing.

In order to improve the contact between these spiral fins and the tubing, it has already been suggested to wind the fins from a metal strip whose contact edge is angled off to provide a narrow supporting edge engaging the surface of the tubing. Obviously, the angled edge on the metal strip greatly effects its edgewise bending characteristics, by shifting the neutral axis of the strip profile much closer to the contact edge. One desirable result of this change is a reduction in the previously encountered buckling tendency of the metal strip on its contact edge under the bending compression. This advantage, however, is only obtained at the cost of greatly increased elongation at the outer edge of the strip.

It has further already been suggested to apply this manufacturing method to oval tubing. The latter is preferable to round tubing, inasmuch as a greater contact area for heat transfer to the gaseous carrier medium is obtained, within a given flow cross section for that carrier medium. A method and apparatus for obtaining such oval finned tubing is disclosed in the German Pat. No. 1,402,779 and in the corresponding British Patent Specification No. 947,544. These prior art patents disclose a machine designated for automatically winding a metal strip onto an oval length of tubing, after the contact edge of the strip has been bent over at a 90°-angle. In practice, however, it was found that this machine, as proposed, was not capable of trouble-free operation, due to the tendency of the angled contact edge to buckle under the bending compression, especially when the latter reaches its peak on the small radius of the oval tubing contour.

Other prior art suggestions using a fin strip profile with an angled contact edge feature a contact edge of such a width and thickness that the neutral axis during bending practically coincides with the angled edge itself, meaning that virtually no longitudinal contraction takes place, while the upstanding portion of the fin is elongated as a function of its radius from the tubing axis. Such a large angled contact edge effectively eliminates any buckling tendency at that edge during winding, by eliminating the bending contraction through a shift of the neutral axis into the angled edge itself.

SUMMARY OF THE INVENTION

Underlying the present invention is the primary objective of devising a method and apparatus for winding spiral fins onto oval tubing, whereby the fins are constituted of a continuous length of metal strip having a narrow angled contact edge, the method and apparatus being perfected to a point where the abovementioned mentioned buckling tendency is effectively eliminated.

The present invention proposes to attain this objective by suggesting a method and device for winding one or several spiral fins onto oval tubing, whereby the constituent metal strip (or strips) is bent to form an acutely angled contact edge, and buckling at the contact edge is prevented through the application of longitudinal tension to the strip during winding and the simultaneous application of transverse compression to that portion of the metal strip which is being elongated at the winding point. This simultaneous application of longitudinal tension and transverse compression effectively shifts the neutral axis of the bending strip profile to, or near to, its contact edge.

The novel method further provides for the arriving metal strip to be guided by means of guide blades of which one engages its bent-over contact edge so as to axially position the arriving strip. At the winding point, i.e. the point of maximum bending, the acute angle of the guide blade changes gradually into a right angle, thereby ironing the angled contact edge of the strip against the tubing surface. This "ironing" effect may be assisted by the bending deformation itself, if the longitudinal tension is such that the neutral bending axis is located at or near the tip of the acutely angled strip edge. The ironing guide blade, by guiding the arriving strip and by also flattening it angled edge, effectively prevents the latter from buckling sideways or radially.

The invention further suggests a device for practicing the proposed novel method, the device including a lathe-like machine with a hollow spindle stock positioning and rotating a length of oval tubing, while a carriage, advancing through the action of a lead screw, feeds one or several metal strips for storage reels to the axially advancing winding point on the tubing. This winding point also executes a radial reciprocating motion in conformance with the peripheral contour of the oval tubing.

More specifically, the preferred embodiment of the device of the present invention features a moving carriage with two fin winding units feeding metal strips to diametrally opposite points on the oval tubing, thereby effectively eliminating the bending deformation to which the oval tubing is otherwise subjected, if only one metal strip is wound onto it. The simultaneous winding of two metal strips onto the tubing thus not only doubles the machine output, it also makes possible a higher winding speed, because of the aforementioned stabilization of the tubing length during the winding operation.

The winding heads themselves are preferably arranged horizontally opposite each other with respect to the axis of rotation of the oval tubing, the winding points on the periphery of the oval tubing being located vertically opposite each other. It should be understood, however, that three or even more winding heads could be arranged on a common carriage, for a still higher productivity of the winding device.

The preferred embodiment of the proposed device further includes means for producing very long pieces of finned tubing in successive winding operations, during each of which a length of fins corresponding to the throw of the machine carriage is applied. For this purpose, the winding operation is automatically interrupted, as soon as the carriage reaches its far end position, whereupon the carriage and the tubing are shifted in the direction of the spindle stock to the starting end position of the carriage, as the finished length of finned tubing extends beyond the spindle stock, into a suitable tubing support. At this point, another length of fins can be wound onto the oval tubing, and this intermittent winding process is continued until the entire length of tubing is enveloped with the spiral fin, or fins.

The device according to this invention also includes means for eliminating the difficult and time-consuming startup of the winding procedure on each length of tubing, by coupling to the trailing end of a length of tubing which is just being worked the leading end of a new length of tubing, and by continuing the fin winding operation across the coupling, from the former to the latter. After the finished length of tubing has been advanced beyond the spindle stock, it is separated from the next length of tubing, which is now being worked in the device, by simply cutting the fin, or fins, at the coupling point between the two pieces. Due to the fact that the tubing is of oval shape, consecutive lengths can be coupled together by simply inserting a matching oval mandrel into their adjoining ends and by axially holding the second length of tubing against the first.

BRIEF DESCRIPTION OF THE DRAWINGS

Further special features and advantages of the invention will become apparent from the description following below, when taken together with the accompanying drawings, which illustrate, by way of example, embodiments and operative principles of the invention, represented in the various figures as follows.

DESCRIPTION OF THE PREFERRED EMBODIMENTS

Figure 1:
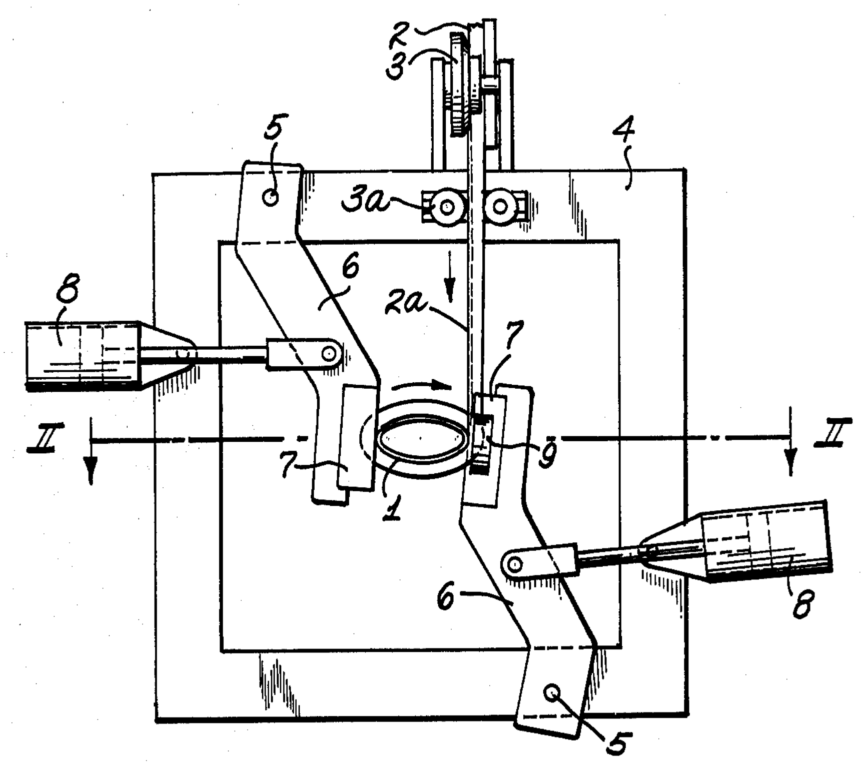
FIG. 1 is a schematic representation depicting the winding of a single spiral fin onto oval tubing in accordance with the present invention.
Figure 2:
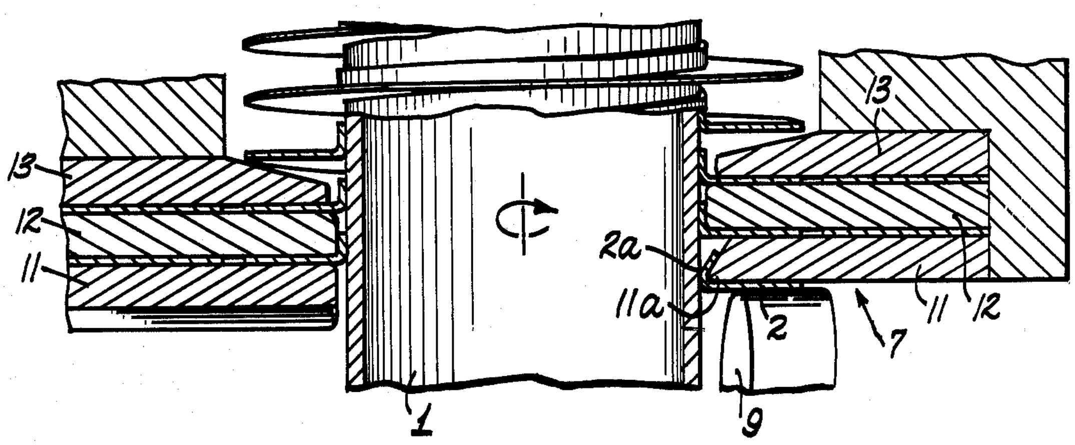
FIG. 2 shows, in an enlarged representation corresponding to a section along line II—II of FIG. 1, a portion of an oval tube, as a single spiral fin is wound onto it.

Referring to the drawings, FIGS. 1 and 2 illustrate the principle steps involved in practicing the method of the invention, using a device which is depicted in a schematic representation. A length of oval tubing 1 is surrounded by a square head frame 4 carrying a winding device. This winding device consists essentially of two winding arms 6 pivotably attached to the head frame 4 at the pivots 5, and engaged by the piston rods of compressed air cylinders 8. One of the two winding arms 6 carries a winding guide 7 with a stretch roller 9. Into this winding guide is fed a continuous strip 2 of highly ductile sheet metal, which arrives from a supply reel (see FIG. 7, for example). As it approaches the winding head, the initially flat metal strip 2 is shaped by angling off one of its edge portions, so that the resulting strip profile resembles a hook, or a check mark, the relatively short bent-over edge portion forming an acute angle with the longer remaining flat portion of the strip profile. This shaping operation is performed by means of shaping rollers 3 and 3*a* which are shown schematically in FIG. 1.

Rotation of the oval tubing 1 causes the shaped metal strip to be wound around the circumference of the oval tubing, whereby its bent-over contact edge 2*a* is pressed against the tubing wall. In order to maintain the larger leg of the strip profile flat and upright in relation to the tubing surface, and especially in order to prevent any buckling of that strip at or near its contact edge, a winding guide is provided at the winding point, as can be seen in more detail in FIG. 2. The winding guide 7 consists essentially of a first guide blade 11 and two additional guide blades 12 and 13. The first guide blade, arranged axially behind the arriving metal strip 2 has an acutely angled guide edge 11*a* with which it engages the bent-over contact edge of the metal strip 2. The guide blade 11 thus not only positions the arriving metal strip 2 against the circumference of the oval tubing 1, it also serves to axially position the metal strip 2, by engaging the groove-like profile which is the result of the acute angle between the short and long legs of the strip profile.

At the winding point, i.e. the point at which the arriving metal strip 2 is bent from its straight shape into an oval spiral corresponding to the contour of the tubing 1, a stretch roller 9 engages a major portion of the width of strip 2, by pressing the latter against the first guide blade 11. The stretch roller 9, by pressing the arriving metal strip against the first guide blade 11, also acts as a strip brake, exerting a tension on the metal strip in opposition to the rotary movement of the oval tubing 1.

The simultaneous application to the arriving strip 2 of longitudinal tension, by means of the strip brake, and of transverse rolling pressure, by means of the stretch roller 9, make it possible to bend the metal strip around the circumference of the oval tubing, even around its small radius - which may be as small as one-half of the width of the metal strip 2 - without the metal strip buckling sideways during the bending operation.

The successful prevention of such buckling is believed to be the result of the following conditions. The edgewise bending of a thin metal strip will inevitably result in buckling of the compressed, i.e. inner edge, unless the neutral bending axis is shifted to the vicinity of that edge, or beyond. Normally, when a bending force is applied to a regular, symmetrical profile, its neutral axis passes through the midpoint of the profile, meaning that identical forces of compression and tension, are exerted on the profile on opposite sides of the neutral axis, the stress increasing linearly to a maximum stress value at the two most distant points, i.e. the edges. The neutral axis can be shifted toward one edge of the profile, by reinforcing that edge, as by bending the profile into an L-shape. Such an L-shape will be better capable of withstanding compression, but in the case of thin metal strip, it will still buckle rather than undergo the desired longitudinal contraction.

The neutral axis can also be shifted by subjecting the entire profile to longitudinal tension, this tensile stress adding itself to the tensile stress on the outer side of the profile, and subtracting itself from the compression stress on the inner side of the profile. In the case of a very tall and slim profile, as is the case with the metal strip 2 which is to be wound edgewise around a very small radius, even the application of tensile stress to the strip may be insufficient, as we have found in connection with a prior art device built in accordance with German Pat. No. 1,402,779. Obviously, the longitudinal tension applicable to the metal strip during winding is limited by the tensile strength of the strip itself.

We have found that the neutral axis shifting effect of longitudinal tension applied to the metal strip 2 can be greatly increased by also applying to the strip a transverse compression, preferably by means of a pressure roller. The combined longitudinal tension and transverse compression produce an unprecedented degree of elongation on the outer edge of the strip during winding.

We have also discovered that a further improvement of the method is possible, when the contact edge of the metal strip 2 is bent more than 90°, so that an acute angle is formed between the short and long legs of the strip profile. The superior performance of such a hook-shaped profile over a rectangular L-shaped profile may be due to the fact that the hook-shaped profile will permit a certain degree of bending contraction at the contact edge without buckling, as for example, when the neutral axis coincides with the bent-over extremity of the profile.

The acutely angled contact edge of the arriving metal strip 2 affords the additional advantage of making it possible to axially guide the metal strip before and while it arrives on the circumference of the oval tubing 1. Once bent in accordance with the tubing contour, the short leg 2*a* of the strip shape is flattened or "ironed" against the surface of the oval tubing 1. For this purpose, the second guide blade 12 has a suitable end face positioned at a distance from the oval tubing surface which corresponds to the gauge of the metal strip 2. The resulting fin structure on the oval tubing presents a very stable assembly, the short leg portion of the metal strip spiral assuring a good contact between the fins and the oval tubing for optimal heat convection. For a still better contact between the fins and the oval tubing, the assembly may be sweated together. In the case of steel constituent parts, for example, this may be done by hot-galvanizing them in a suitable bath, whereby any gaps between the fins and the oval tubing are filled through capillary action of the sweating metal.

Figure 3:
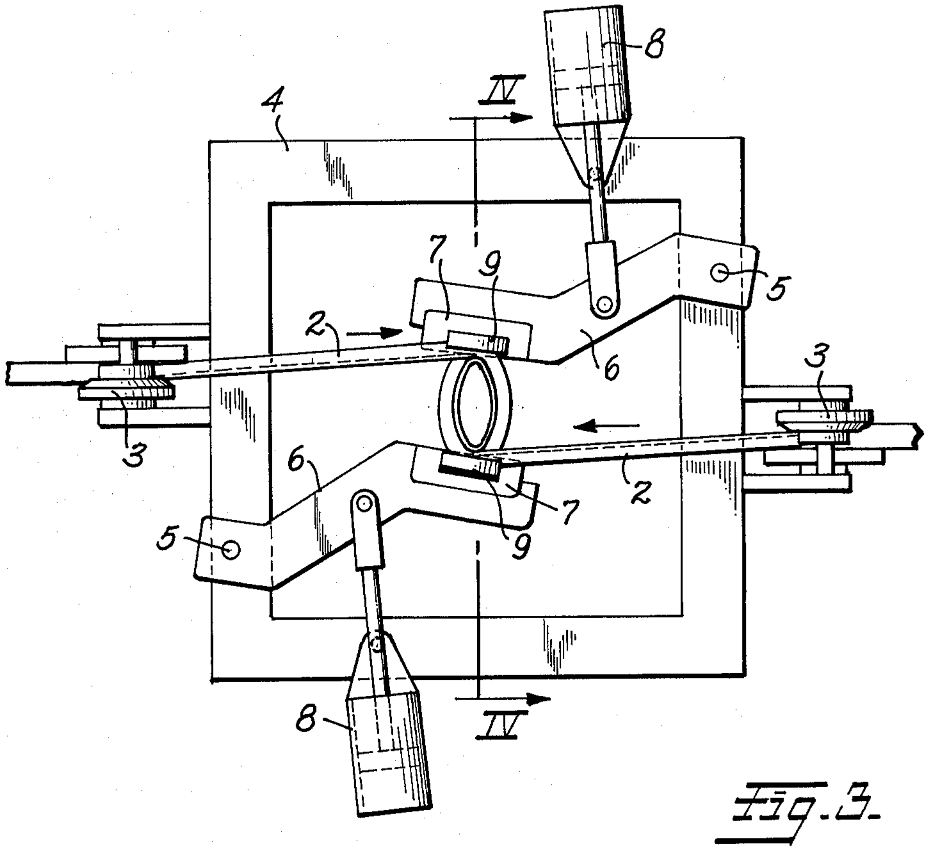
FIG. 3 shows a modified winding method in which two spiral fins are simultaneously wound onto oval tubing.
Figure 4:
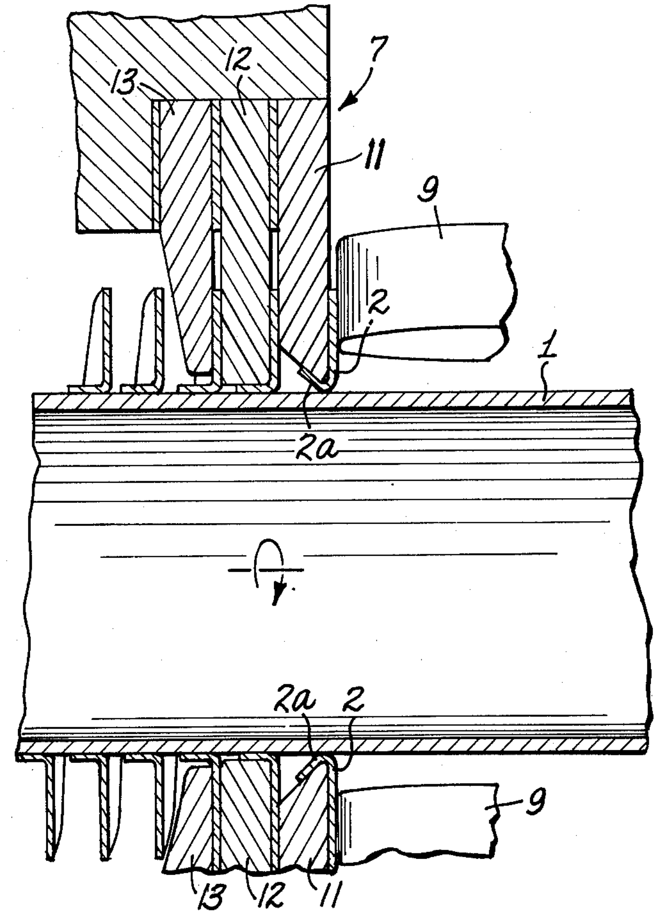
FIG. 4 is a cross section along line IV—IV of FIG. 3, showing enlarged cross-sectional details of the winding configuration.

In FIGS. 3 and 4 of the drawing is illustrated a modified mode of the method of the invention, featuring two metal strips 2 being wound onto a length of oval tubing 1 from diametrally opposite sides, thereby producing a "double-threaded" fin spiral on the tubing. In general, the winding operation is the same as in the previously described winding mode, except that certain additional operational advantages are characteristic of this mode:

The arrangement of identical winding arms on opposite sides of the oval tubing conveniently balances the winding forces which, in the case of a single metal strip, for example, represent a considerable bending stress on the oval tubing itself. With oval tubing, this bending effect is further aggravated by the continuously changing leverage on the rotating oval tubing, with the result that the latter tends to vibrate, if it is not very carefully supported and journalled. The use of twin winding arms per FIG. 3 thus not only doubles the production rate, because two strips 2 are wound onto the oval tubing 1 simultaneously, it also permits a higher speed of rotation of the oval tubing, because of the balance between the winding forces.

As FIG. 4 shows, this winding mode simply uses a second, identical winding guide opposite the first one. Obviously, however, the winding guides in this case have to be oriented at a greater pitch angle with respect to the tubing axis, because the axial pitch of the fin spirals is now twice as large.

Figure 5:
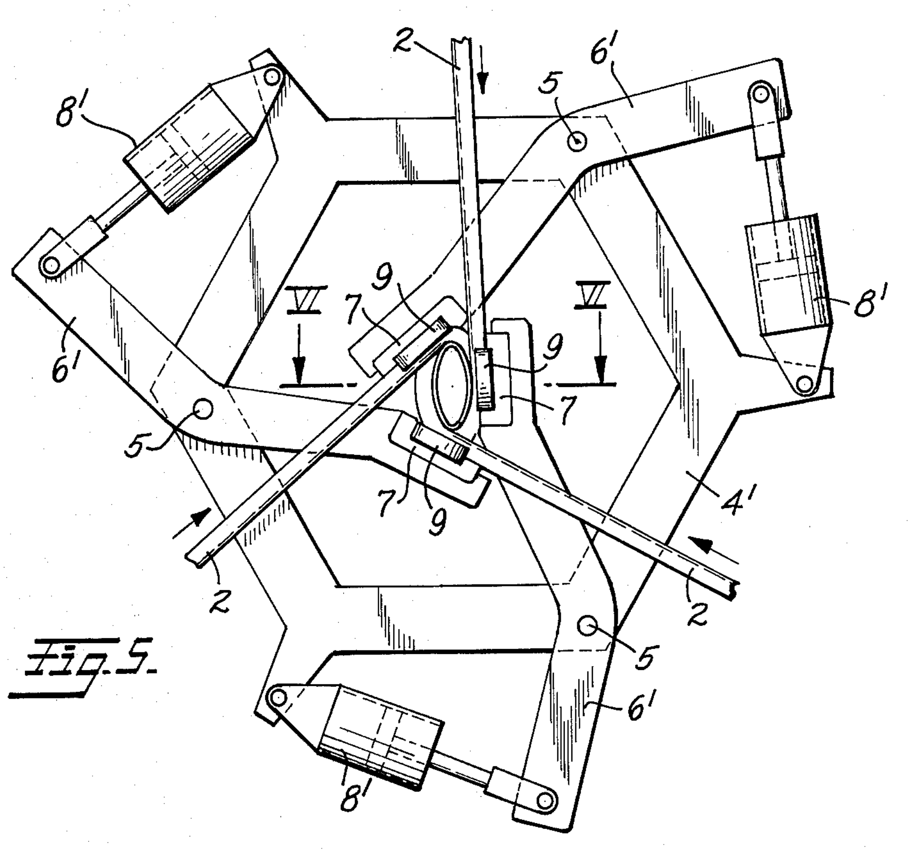
FIG. 5 shows a still further version of the method of the invention in which three spiral fins are simultaneously wound onto oval tubing.
Figure 6:
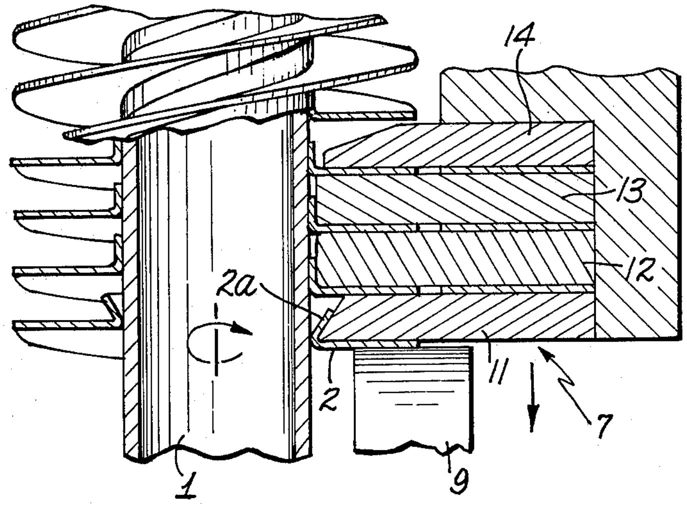
FIG. 6 shows the corresponding winding configuration as seen in a cross section along line VI—VI of FIG. 5.

FIGS. 5 and 6 show how the development from one to two winding heads can be extended to three winding heads, which simultaneously feed three metal bends 2 to the rotating oval tubing 1. The earlier-mentioned advantages available in connection with two winding heads apply in an analagous manner. FIG. 6 shows the corresponding winding guide of one of the three winding heads.

It should be understood that it is also possible to modify a single winding head so as to feed two metal strips side-by-side onto the rotating oval tubing, in which case both the first and second guide blades would have to have an acutely angled guide edge.

Figure 7:
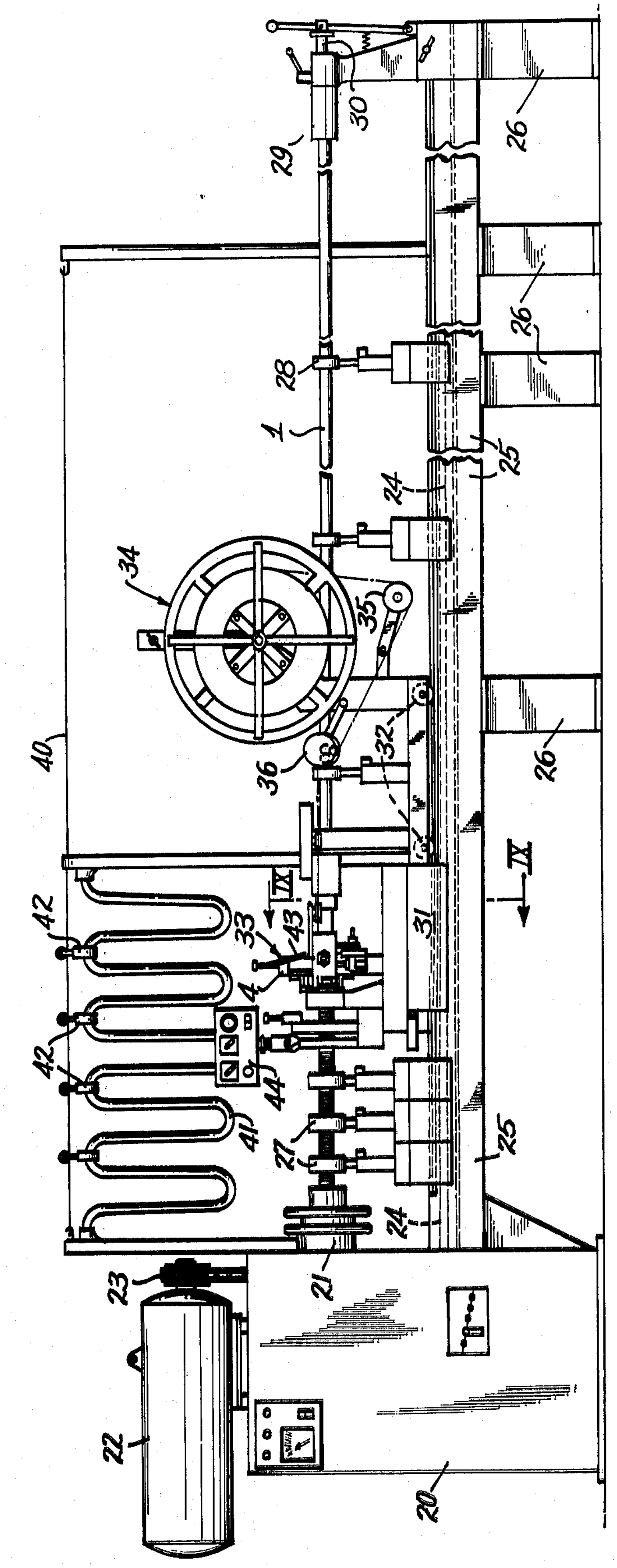
FIG. 7 illustrates in an elevational view a machine and device for practicing the method of the invention, as proposed in FIGS. 3 and 4 herein.
Figure 8:
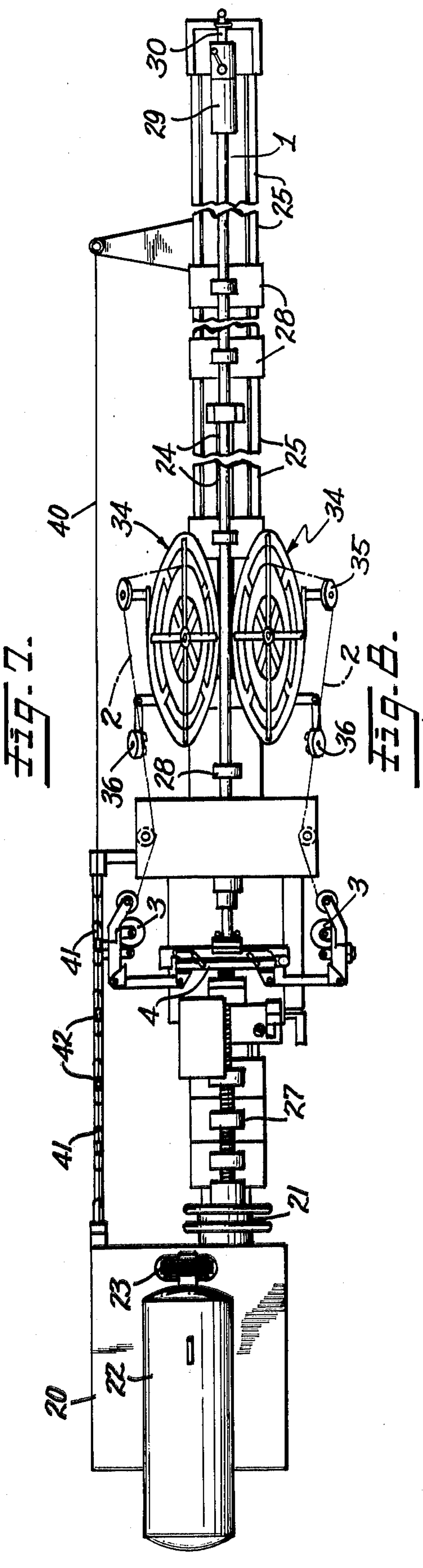
FIG. 8 shows the machine of FIG. 7 in a plan view.
Figure 9:
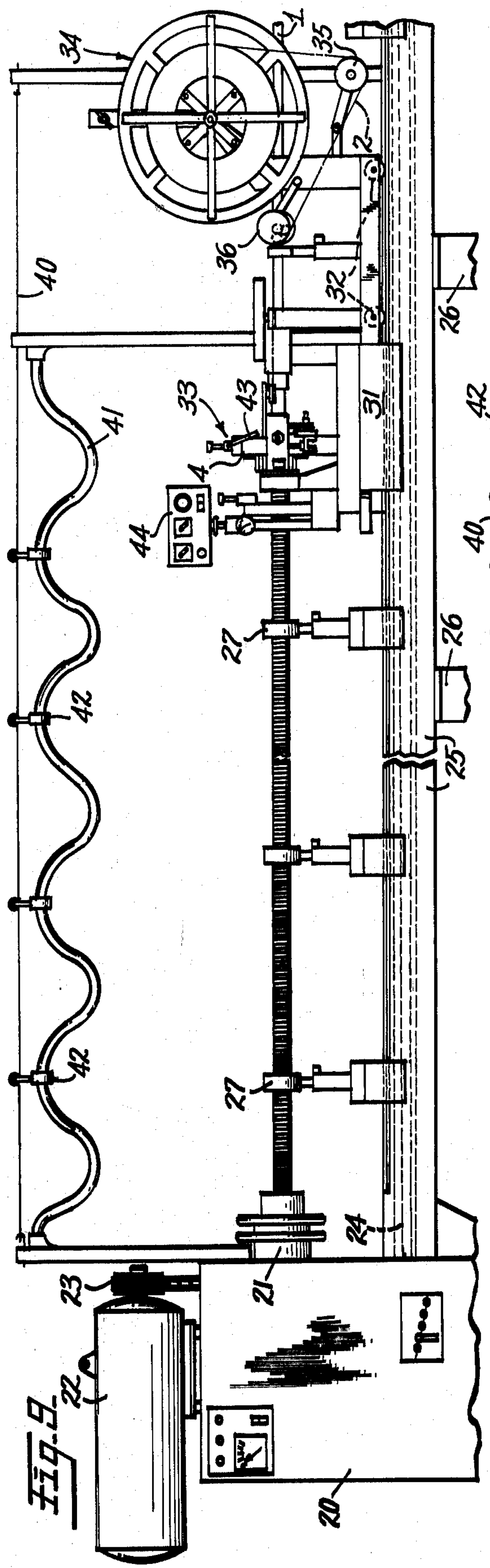
FIG. 9 relates to FIG. 7, showing the winding device at the far end of its winding throw.
Figure 10:
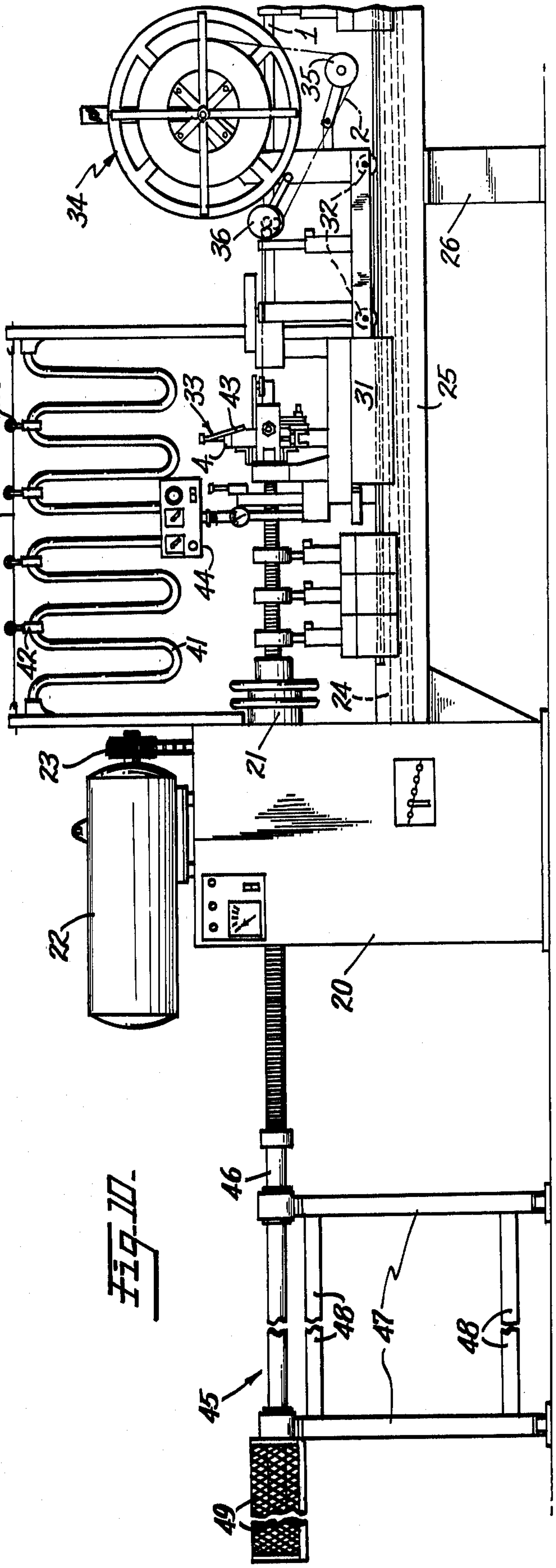
FIG. 10 shows the same machine, with the winding device and partially wound tubing returned to their starting position.

FIGS. 7–10 of the drawing illustrate a machine and device for practicing the method which is disclosed hereinabove. FIGS. 7 and 8 show the machine in corresponding elevational and plan views, in a first operative position. FIG. 9 shows the same machine in a second operative position, while FIG. 10 shows the machine in the first operative position, at the start of a different operative cycle.

The proposed machine and device for winding spiral fins onto oval tubing, designed for simultaneously winding two fins, consists essentially of a lathe-like machine frame, with a drive block 20 arranged on the left-hand extremity of a long machine bed 25. Like in a lathe, the drive block 20 accommodates speed selecting gears and a main hollow spindle with a chuck 21 reaching over the left-hand extremity of the machine bed 25. The gears and spindle are driven by means of an electric motor 22 and an intermediate chain drive 23. Along its length, the machine bed 25 is supported by a number of leg supports 26. On the machine bed, in turn, are supported a number of steady rests 27 and 28 which are longitudinally movable in response to the longitudinal movement of a carriage assembly 31, likewise supported on the machine bed 25. A lead screw 24, driven by the gears inside the drive block 20, extends along a major portion of the machine bed 25 and engages the carriage assembly 31 by means of a releasable spindle nut 50 (FIG. 11).

A length of tubing 1 is seen to extend horizontally between the chuck 21 and a tailstock 29, where a thrust member 30 urges the tubing in the direction against the chuck. The tubing portion between the chuck 21 and the carriage 31 is shown to have been wound with fins, being supported by the steady rests 27, while the longer tubing portion between the carriage 31 and the tailstock 29 is being supported by the steady rests 28.

Figures 11, 13:
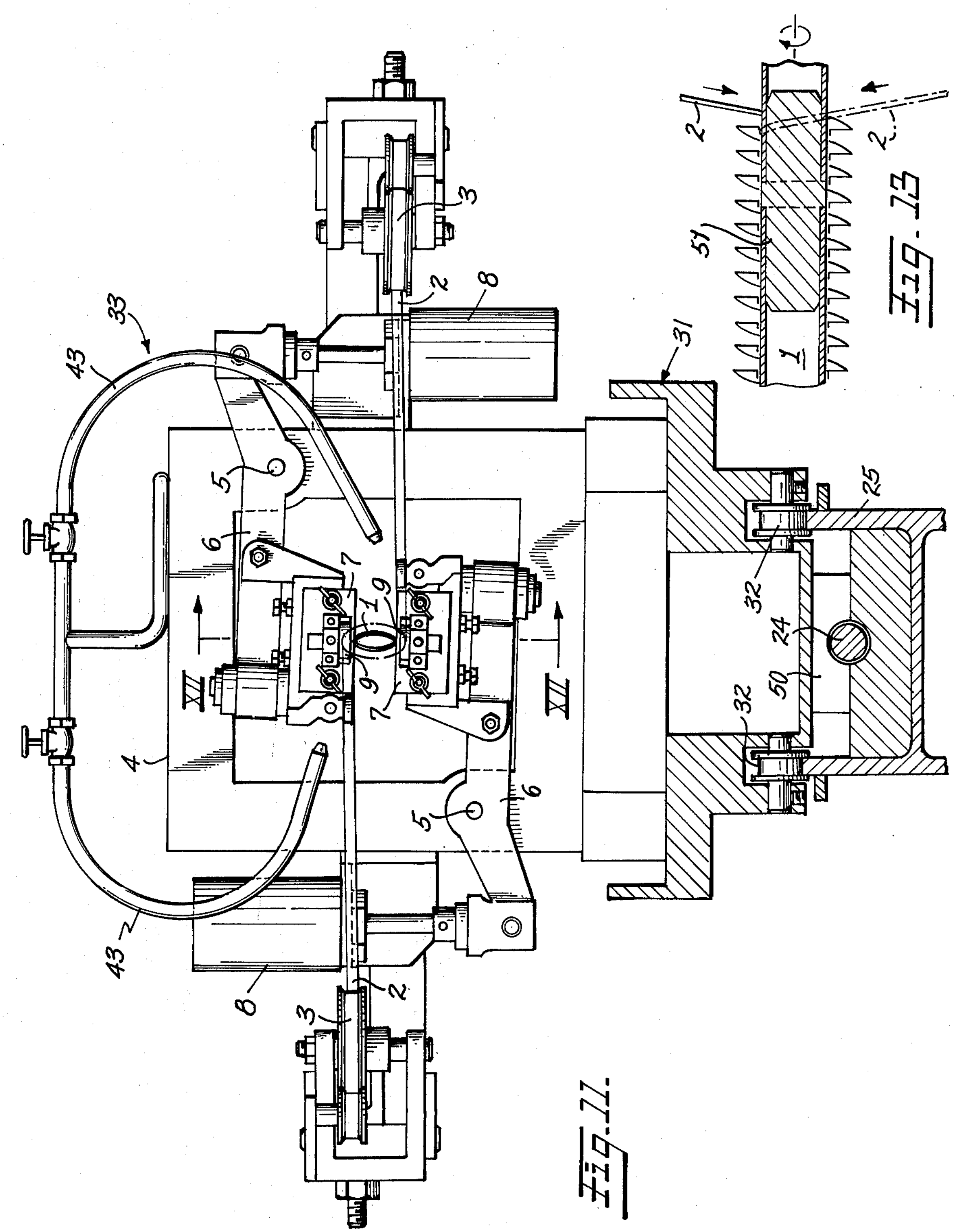
FIG. 11 shows, in an enlarged transverse cross section, design details of the twin winding heads of the device of FIGS. 7–10.
FIG. 13 shows how successive lengths of oval tubing are coupled together.

The carriage assembly 31, shown cross-sectionally in greater detail in FIG. 11, is supported on the machine bed 25 by means of a plurality of track rollers 32. On the carriage base is mounted a dual winding head 33, supported on a square head frame 4. On this head frame 4 are arranged the pivots 5, winding arms 6, winding guides 7, air cylinders 8, and stretch rollers 9 which have been described earlier in connection with FIGS. 1-6 and with the method suggested by the present invention. The carriage assembly 31 further carries two strip reels 34 (FIGS. 1 and 2), from where two continuous strips 2 are fed to the winding head 33. Each strip passes over a spring-loaded guide roller 35 and a strip feed monitor 36 to a set of shaping rollers 3, shown in more detail in FIG. 11. Thus, the metal strip 2, leaving the inclined strip reel 34 in a downward direction, runs around the guide roller 35 where it advances forwardly to the shaping rollers 3. Leaving the shaping roller assembly, each strip has a bent-over edge on one side and is oriented vertically to move toward the winding point on the oval tubing 1 (see FIG. 11) at an angle which corresponds to the desired pitch angle of the fin spirals on the oval tubing 1.

Figure 12:
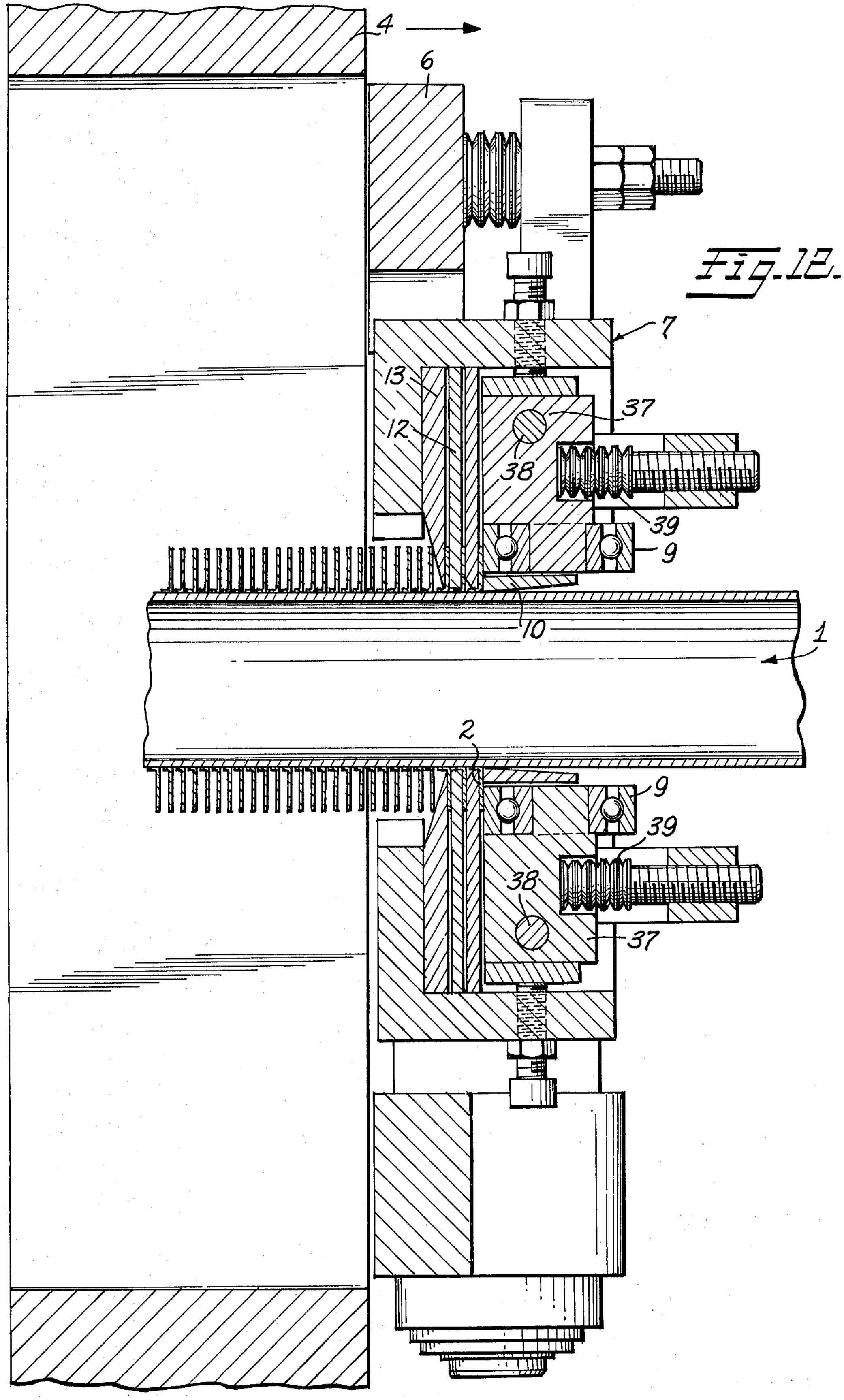
FIG. 12 shows a still further enlarged partial longitudinal cross section through the winding device of FIG. 11, the winding principle of FIG. 12 corresponding to that of FIG. 4.

FIG. 12 shows, in an enlarged longitudinal cross section through the winding head 33, a portion of the oval tubing 1 as well as the cooperating upper and lower winding arms 6 with their winding guides 7 at the point where the arriving metal strip is wound onto the tubing 1. This representation corresponds substantially to the schematic representation of FIG. 4. In addition to the stretch rollers 9, which are both supported on roller arms 37, pivoted at pivots 38, each roller arm also carries a guide skid 10, riding against the outer surface of the oval tubing 1, under the preload created by the associated air cylinder 8. The guide skids 10 thus determine the desired position of the guide blades 11, 12, and 13 of the winding guide 7 with respect to the changing radius of the tubing 1.

The winding arms 6 thus reciprocate up and down in accordance with the changing diameter of the oval tubing 1, the air cylinders 8 acting as springs. A package of cup springs 39, supported on an adjustable stud, urges the stretch roller 9 axially against the outer half of the arriving metal strip 2, just as the latter is being bent from its straight outline into a curvature that corresponds to the particular circumferential curvature of the oval tubing 1 at the winding point. FIG. 12 shows the stretch rollers 9 to be ball bearings. The winding head is also equipped with suitable adjusting means for an orientation of the winding guide in accordance with the pitch angle of the fins. The winding operation, taking place simultaneously at the upper and lower horizontal tangent points of the oval tubing 1, has been described in detail further above, in connection with the disclosed method of the invention.

The fin winding machine of FIGS. 7-10 is designed for automatically winding a given length of fins onto the oval tubing 1, as determined by the longitudinal throw of the carriage assembly 31 on the machine bed 25. For this purpose, the machine has mounted above it a carrying cable 40 on which are suspended several runners 42 carrying flexible supply lines 41. One of the supply lines feeds cooling liquid to the winding points in the winding guides 7, via appropriate pipes 43 on the winding head 33 (FIG. 11). Another supply line feeds compressed air to the air cylinder 8, while various electric connections link the machine controls on the carriage with those on the drive block.

The startup of the winding operation on a length of tubing requires a special procedure only for the very first length of tubing, where the ends of the metal strips have to be welded, or otherwise attached to the oval tubing 1. Once the winding operation has been started, successive lengths of tubing can be wound without the need for such a startup operation, as will be described further below. During winding, the carriage assembly 31 advances automatically from its left-hand starting position to the right, at a rate of advance that corresponds to the number of revolutions executed by the oval tubing 1, as determined by the lead screw 24 and the cooperating spindle nut 50 of the carriage 31. Thus, as the chuck 21 turns the tubing at a regular speed, the carriage assembly 31 advances to the right, thereby winding two metal strips 2 onto the tubing in an automatic operation. The strip feed monitors 36 immediately stop the machine, should one of the metal strips 2 break or run out on the strip reel 34. In the latter case, the empty reel is replaced with a full strip reel and the ends of the strips are welded together and appropriately chamfered, whereupon the winding operation can be continued.

Instead of having the oval tubing rotate at an even speed and the metal strips feeding accordingly at a wavy speed, it is also possible to rotate the tubing at a wavy speed for an even speed of strip advance, using elliptical gears or some other wave motion generating means in the drive block.

The winding machine stops automatically, when the carriage assembly 31 reaches the far end of its throw. This machine position is shown in FIG. 9. Now, the oval tubing 1 is released from the clamping jaws of chuck 21, and both the tubing 1 and the carriage assembly 31 are moved to the left, back to the starting end position of the carriage. Since the main spindle in the drive block 20 is hollow, a portion of the finished tubing now protrudes to the left of the machine, where a tubing stand 45 guides and supports that portion of the tubing against fluttering during rotation. The tubing stand 45 is of very simple construction, consisting essentially of a receiving tube 46 arranged in alignment with the spindle axis of the machine, the receiving tube 46 being supported by a frame consisting of uprights 47 and longitudinal members 48. A removable guard screen 49 protects that portion of the finished tubing which might protrude from the far end of the tubing stand 45.

Following the return maneuver of the carriage assembly 31 and the simultaneous repositioning of the oval tubing 1, a new automatic winding cycle can be initiated by actuating appropriate controls on the control panel 44. These winding cycles are repeated, and the tubing 1 is advanced each time by a distance equal to the longitudinal throw of the carriage assembly 31, until the length of oval tubing 1 is entirely covered with fins.

The proposed machine is further adapted for automatically continuing the winding operation beyond the trailing end of a first length of tubing, onto the leading end of a second length of tubing. For this purpose, the two lengths of oval tubing 1 are axially adjoined and rotationally coupled to one another, as shown in FIG. 13. The second length of tubing is axially urged against the first length of tubing by means of the spring-loaded thrust member 30 of the tailstock 29. The oval shape of the tubing makes rotational coupling of the adjoining tubing length very simple, a suitable oval mandrel 51 which engages the end portions of both lengths of tubing being sufficient for this purpose. When the first length of tubing is fully wound and the junction between it and the second length of tubing has reached a position between the main spindle and the tubing stand 45, the two lengths are separated by simply severing both spiral fins at the tubing junction and by removing the coupling mandrel 51.

The winding procedure, as described, thus completely eliminates the difficult procedure of initially attaching the metal strips 2 to the starting end of the oval tubing 1. The only remaining special procedure is that of welding together the trailing strip end of an exhausted strip reel 34 and the leading end of a new, full reel. The novel winding method of this invention and the proposed machine and device for practicing this method are thus capable of semi-automatically winding spiral fins onto oval tubing in an efficient and reliable production operation.

It should be understood, of course, that the foregoing disclosure describes only a preferred method and embodiment of the invention and that it is intended to cover all changes and modifications of these examples of the invention which fall within the scope of the appended claims.

We claim the following:

1. A method of producing finned heat transfer tubing of oval cross section, by winding a continuous metal strip around a length of oval tubing having a maximum diameter is at least fifty percent larger than its minimum diameter, in order to form a continuous spiral fin thereon, the method comprising the steps of:

rotating said length of oval tubing about its longitudinal axis;

feeding to at least one winding point on the circumference of said tubing, in a transverse tangential direction, a continuous strip of ductile sheet metal of an on-edge height equal to at least ten times its gauge, the strip or strips, respectively, being advanced through the rotation of said tubing by virtue of a starting attachment between the strip and tubing;

shaping the metal strip, or strips, prior to arrival at the winding point, into a hook-like cross-sectional profile, so as to give the metal strip a contact edge with a laterally extending flange portion which is bent substantially more than 90° into an acute angle with the remainder of the strip;

bending the metal strip, or strips, on edge against the circumference of the tubing under high tensile stress applied to said strip, while advancing the winding point or points, respectively, axially relative to the rotating tubing, so as to bend the strip into a spiral fin enveloping the tubing; and guiding and ironing the laterally extending flange portion of the metal strip, or strips, during the bending step, so that said flange portion is flattened against the surface of the tubing.

2. A method as defined in claim 1, further including the step of stretch-rolling, under transverse pressure, at least the outer half of the metal strip in the immediate vicinity of the winding point in connection with said bending step, so as to shift the neutral bending axis of the strip profile to towards its bent-over flange portion.

3. A method as defined in claim 2, wherein the steps of bending the strip under high tensile stress and of stretch-rolling the strip are combined to the effect that the transverse pressure exerted on the strip in connection with said stretch-rolling step also produces at least a portion of said tensile stress, through frictional resistance against the moving strip, under said pressure.

4. A method as defined in claim 1, wherein:

the step of feeding a metal strip involves feeding two generally identical metal strips to two diametrically opposite winding points on the circumference of the tubing; and the step of bending the metal strip involves identical axial advancing movement of both winding points relative to the rotating tubing, so as to produce a double-threaded spiral fin around the tubing.

5. A method as defined in claim 1, wherein the step of feeding a metal strip involves feeding more than two metal strips to angularly regularly spaced winding points on the circumference of the tubing.

6. A method as defined in claim 1, further comprising the step of:

rotationally coupling to the trailing end of a first length of tubing the leading end of a second length of tubing, so as to provide a continuous winding surface;

winding the metal strip or strips, respectively, over the trailing end portion of the former onto the leading end portion of the latter, thereby obtaining said starting attachment between the strip and the tubing; and severing the wound spiral fin or fins, respectively, between the two lengths of tubing, before uncoupling them.

* * * * *